United States Patent
Rogers et al.

(10) Patent No.: US 12,379,694 B2
(45) Date of Patent: Aug. 5, 2025

(54) TIMER KIT

(71) Applicant: Time Timer, LLC, Cincinnati, OH (US)

(72) Inventors: David M. Rogers, Cincinnati, OH (US); Tricia L. Wright, San Francisco, CA (US)

(73) Assignee: Time Timer, LLC, Cincinnati, OH (US)

( * ) Notice: Subject to any disclaimer, the term of this patent is extended or adjusted under 35 U.S.C. 154(b) by 413 days.

(21) Appl. No.: 18/184,185

(22) Filed: Mar. 15, 2023

(65) Prior Publication Data

US 2024/0310787 A1    Sep. 19, 2024

(51) Int. Cl.
*G04B 45/00* (2006.01)

(52) U.S. Cl.
CPC ..... *G04B 45/0069* (2013.01); *G04B 45/0007* (2013.01)

(58) Field of Classification Search
None
See application file for complete search history.

(56) References Cited

U.S. PATENT DOCUMENTS

| | | | |
|---|---|---|---|
| 6,354,840 B1 * | 3/2002 | Armstrong | G09B 1/08 434/168 |
| 8,139,444 B2 | 3/2012 | Schnabel | |
| D956,581 S | 7/2022 | Rogers et al. | |

FOREIGN PATENT DOCUMENTS

| | | | |
|---|---|---|---|
| CN | 2323396 Y | | 6/1999 |
| JP | 2014149253 A | * | 8/2014 |

OTHER PUBLICATIONS

Screen captures of "Time Timer Dry Erase Board" with annotation. YouTube, Jun. 27, 2019, www.youtube.com/watch?v=K6df4hN8ftE. Accessed Jun. 11, 2025. (Year: 2025).*
Time Timer: "Time Timer Dry Erase Board", Jun. 27, 2019 (Jun. 27, 2019), XP093195644, Retreived from Internet : URL: <https://www.youtube.com/watch?v=K6df4hN8ftE> Retreived on Sep. 30, 2024.
R Suarez Y Gonzalez, European Search Report, The Hague, Aug. 16, 2024, 14 Pages.

* cited by examiner

*Primary Examiner* — Regis J Betsch
*Assistant Examiner* — Michael James Walker
(74) *Attorney, Agent, or Firm* — Wood Herron & Evans LLP

(57) ABSTRACT

A timer kit comprises a battery powered timer and a caddy assembly. The battery powered timer has a colored disk attached to a rotatable shaft. The initial position of the colored disk is manually set by an operator using a positioner accessible through a circular opening extending through a front wall of the caddy assembly. The battery powered timer is removable from the caddy assembly in a generally vertical direction behind the front wall of the caddy assembly. The caddy assembly has a receptacle for holding the battery powered timer in a generally vertical orientation behind the front wall of the caddy assembly.

20 Claims, 5 Drawing Sheets

TIMER KIT

FIELD OF THE INVENTION

This invention relates generally to an apparatus and method for teaching time and, more particularly, to an apparatus and method of displaying remaining and elapsed time.

BACKGROUND OF THE INVENTION

Numerous timers show elapsed time in a visual form. U.S. Pat. No. 5,662,479 discloses a timer which discloses a disk which rotates to visualize the amount of time left from a sixty-minute period. As the disk rotates, the visible portion of the disk decreases, indicating to the user that a certain amount of time remains from the original time. The timer must be manually set at the beginning of the time period for any activity. An operator may have difficulty knowing at which time to set the timer based on an activity. For example, an operator may not know whether to set the timer to ten minutes or twenty minutes for an activity, such as getting dressed for school.

Therefore, it would be desirable for a timer to display an image of an activity so an operator may set the timer correctly initially. There is a need for a visual timer kit having a place for clips to display certain activities.

There is further a need for a timer kit using a rotating disk which may display a predetermined time along with an image of an activity.

There is further a need for a visual timer kit having storage compartments for storing pens and the like in which the timer may be inserted vertically into a storage compartment.

SUMMARY OF THE INVENTION

According to one aspect of the invention, a timer kit comprises a generally rectangular timer and a caddy assembly. The generally rectangular timer has a battery compartment for storing at least one battery. The at least one battery powers a control module which includes a shaft which rotates at a predetermined speed.

A rotatable colored disk is secured to the shaft, such that the rotatable colored disk rotates with the shaft. A background member is secured in the recess of the generally rectangular front tray in front of the rotatable colored disk. The background member has a slit through which a portion of the rotatable colored disk passes, such that a portion of the rotatable colored disk is visible to the user. Upon rotation of the shaft and expiration of time, a portion of the rotatable colored disk rotates behind the background member and becomes invisible to the user. In the preferred embodiment, the shaft and rotatable colored disk rotate in a clockwise direction as time elapses. However, the shaft and rotatable colored disk may rotate in the counterclockwise direction as time passes.

The background member has numerical indicia marks outside the colored disk when the colored disk is visible in front of the background member. The background member has a slit through which the colored disk passes upon rotation of the shaft and colored disk, such that upon rotation of the shaft with time, a portion of the colored disk rotates in front of the background member.

A positioner is secured to the shaft to enable a user to manually set the initial position of the rotatable colored disk to indicate a desired time to be elapsed. The positioner is used to set a traveling edge of the colored disk.

The timer kit further comprises a caddy assembly. The caddy assembly comprises a front wall and a molded caddy secured to the front wall. The front wall has a circular opening therein and numerical indicia marks printed thereon around the circular opening. The molded caddy has a holding wall and a plurality of storage compartments. A receptacle is created between the front wall of the caddy assembly and the remainder of the caddy when the two components are secured together. The generally rectangular timer is inserted into the receptacle to assemble the timer kit. Similarly, the generally rectangular timer is separable from the caddy assembly by lifting the generally rectangular timer out of the receptacle behind the front wall of the caddy assembly.

When the timer kit is assembled, the colored disk of the generally rectangular timer is seen and is movable through the circular opening in the front wall of the caddy assembly using the positioner of the generally rectangular timer. The positioner is accessible through the circular opening in the front wall of the caddy assembly to initially set the desired time period.

The timer kit further comprises a plurality of clips adapted to be stored in the storage compartments of the molded caddy. The front wall of the caddy assembly has an annular protrusion around the circular opening with an annular bead at the end of the annular protrusion. The clips each have a recess adapted to receive the annular bead to fix the position of the clip relative to the circular opening in the front wall of the caddy assembly. Each clip may be used to hold a card which denotes a certain event, such as brushing one's teeth.

In a second aspect, a combination timer and caddy assembly may comprise the invention. The timer may be a battery powered timer having a colored disk which rotates as time elapses. A visible portion of the colored disk becomes smaller as time elapses.

The caddy assembly comprises a front wall and a molded caddy. The caddy assembly has a receptacle, which in connection with the front wall, is adapted to receive and retain the battery powered timer. The timer is behind the front wall of the caddy assembly. The colored disk of the battery powered timer is visible through a circular opening in the front wall of the caddy assembly. The front wall has numerical indicia marks printed thereon which indicated to an operator at which time to manually set the position of the colored disking using a positioner accessible through the circular opening in the front wall of the caddy assembly.

In a third aspect, a method of constructing a timer kit is disclosed. The method comprises providing a timer having a colored disk secured to a rotatable shaft such that the colored disk rotates with the shaft as time elapses. A visible portion of the colored disk becomes smaller as time elapses. The timer further comprises a positioner secured to the rotatable shaft for positioning a trailing edge of the colored disk.

The method further comprises providing a caddy assembly including a front wall and a caddy. The front wall has a circular opening therein and numerical indicia marks printed on an outer surface of the front wall. The caddy has a holding wall and a plurality of storage compartments for storing items such as markers to write on a dry erase surface of the front wall of the caddy assembly. The front wall of the caddy assembly and the holding wall of the caddy define a receptacle having a bottom.

The method further comprises vertically moving the timer down into the receptacle through an open top of the receptacle behind the front wall of the caddy assembly such that the colored disk is visible through the circular opening in the front wall of the caddy assembly and the positioner of the timer is accessible through the circular opening in the front wall of the caddy assembly.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
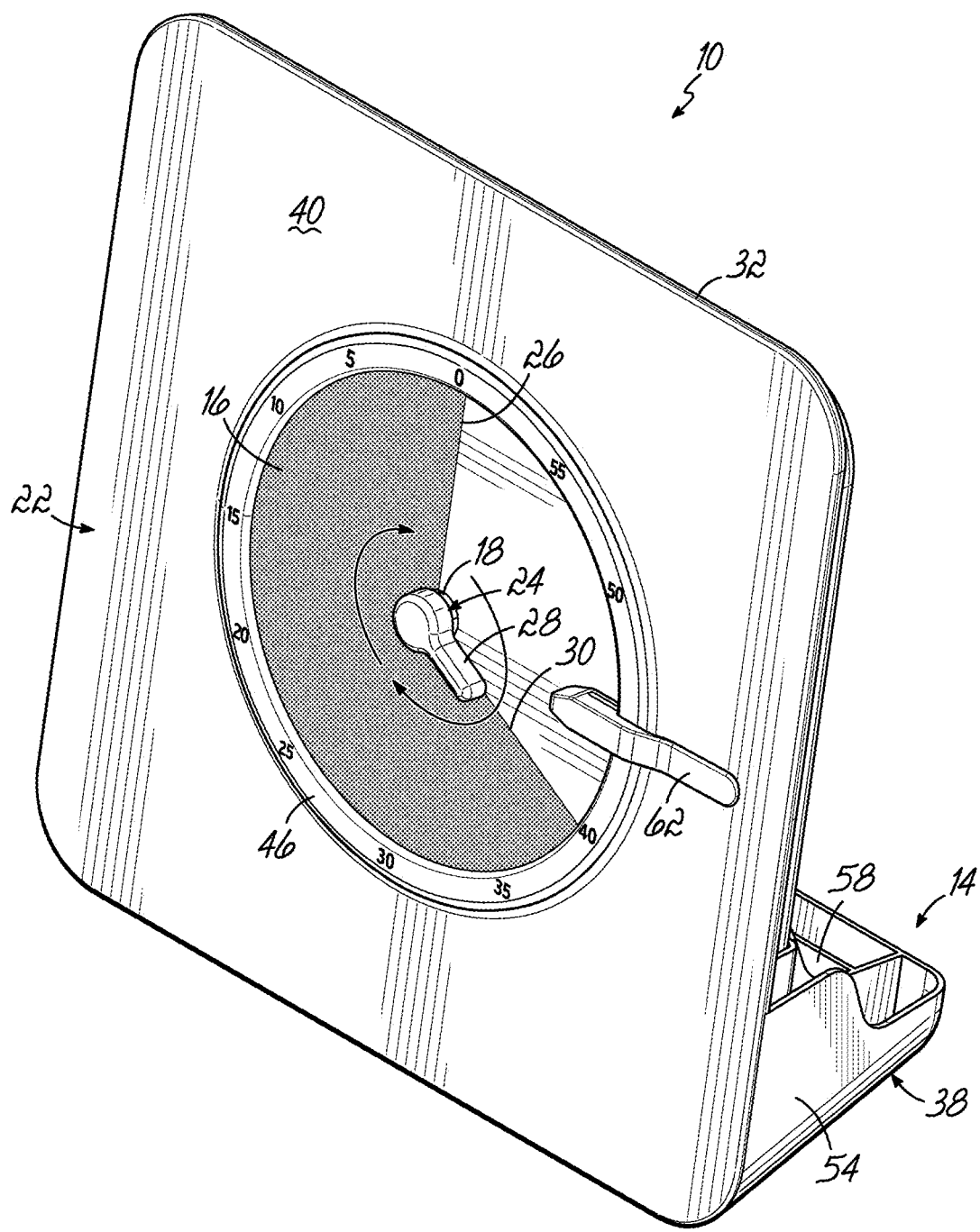
FIG. 1 is a front perspective view of an assembled timer kit showing one clip being used.
Figure 2:
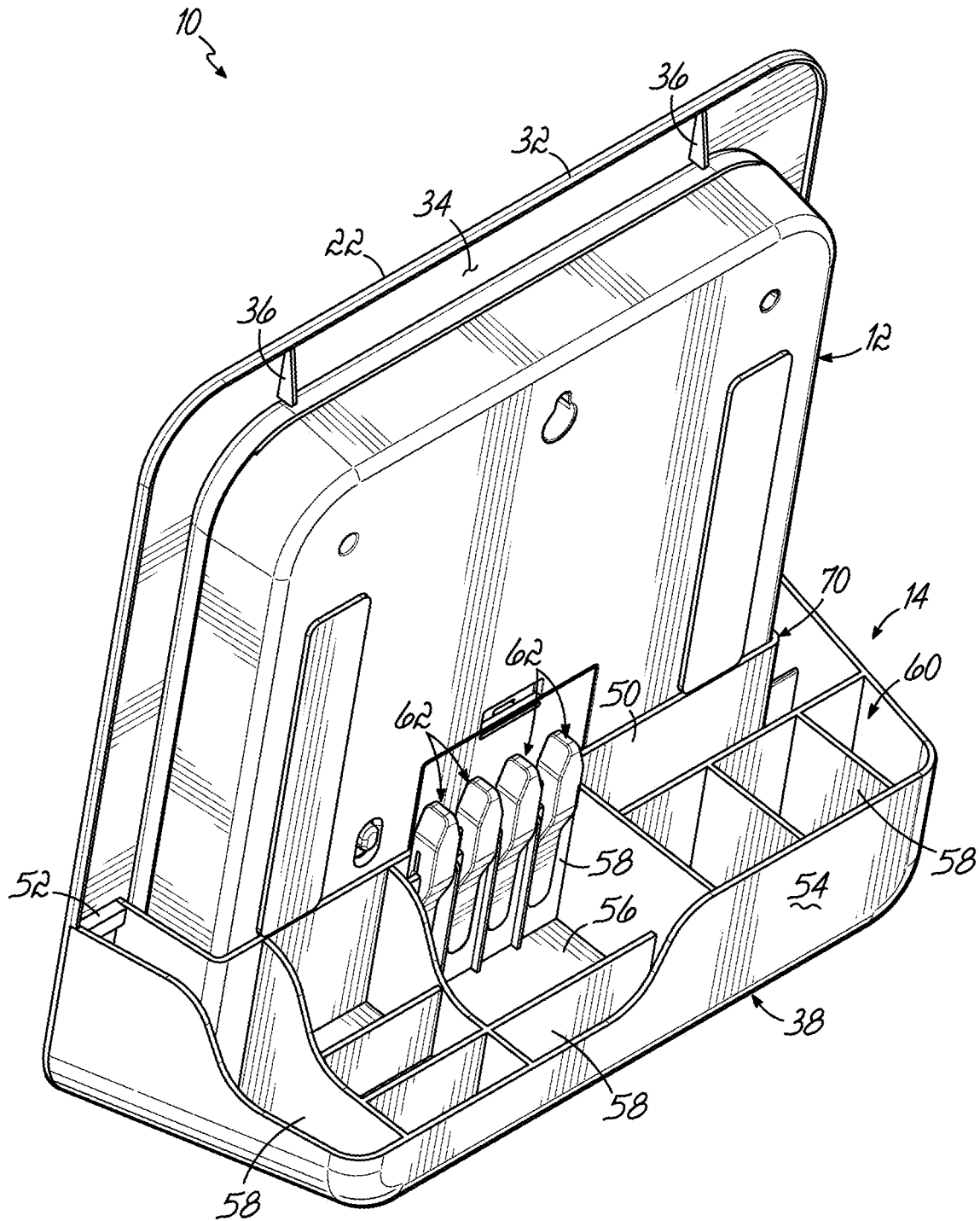
FIG. 2 is a rear perspective view of the assembled timer kit of FIG. 2 showing multiple clips being stored.
Figure 3:
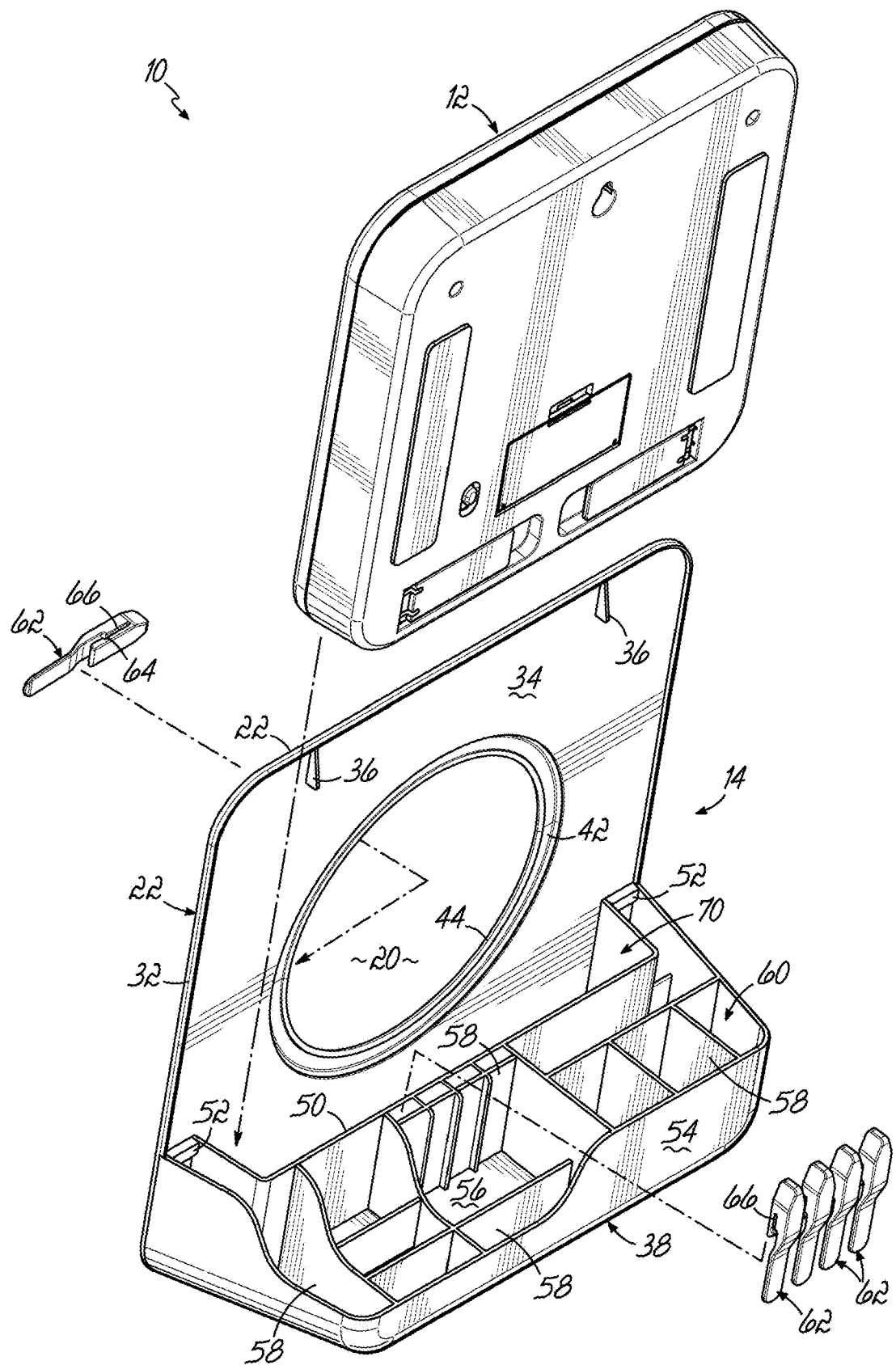
FIG. 3 is a partially disassembled rear perspective view of the timer kit of FIGS. 1 and 2.
Figure 4:
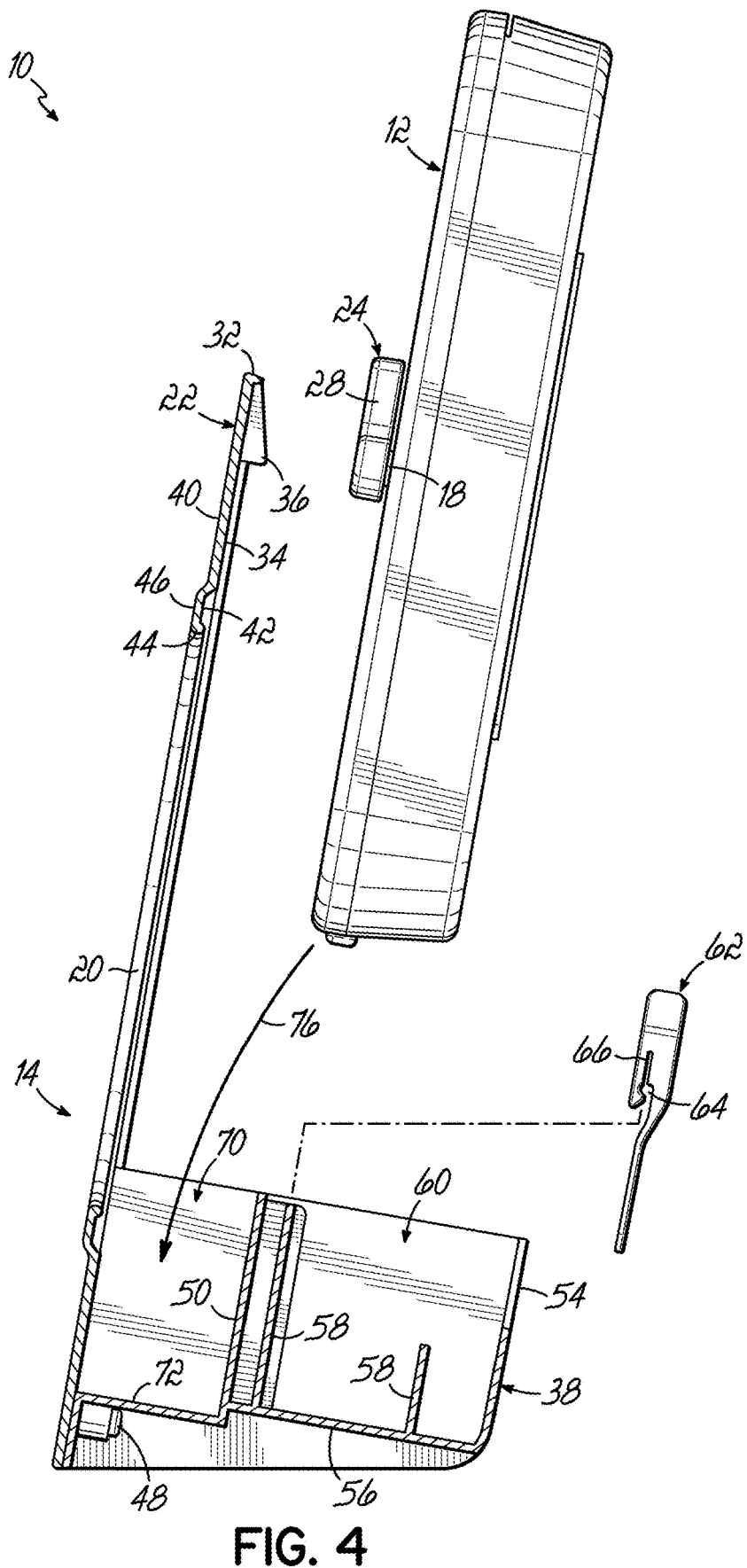
FIG. 4 is a side view partially in cross-section of the timer being inserted into the receptacle of the molded caddy.
Figure 5:
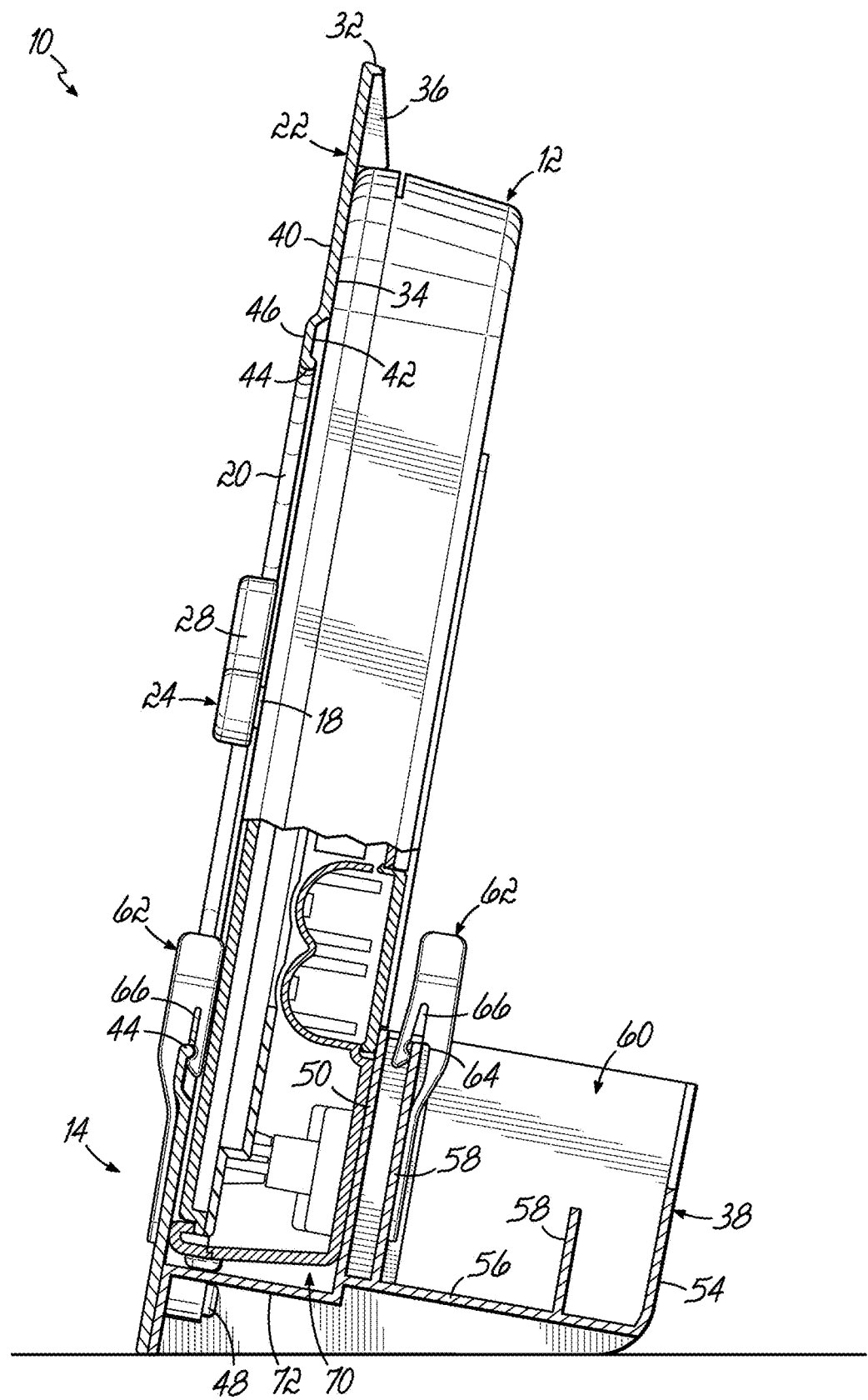
FIG. 5 is a side view partially in cross-section of the timer kit fully assembled of FIG. 1

Referring to FIG. 1, there is illustrated a timer kit 10 incorporating the principles of the present invention. As best shown in FIG. 3, the timer kit 10 comprises two principal components: a battery powered generally rectangular timer 12 and a caddy assembly 14. As best shown in FIGS. 4 and 5, the caddy assembly 14 comprises a front wall 22 and a unitary molded caddy 38. The front wall 22 is secured to the unitary molded caddy 38 with two fasteners 48 (only one being shown). For purposes of this document, the term "caddy" is not intended to be limited by the drawings herein or any dictionary definition. As best shown in FIG. 3, the caddy 38 is preferably a unitary molded member, but may be multiple members joined together.

The battery powered generally rectangular timer 12 is intended to be an eight inch timer available on the website www.timetimer.com. This timer 12 is disclosed in U.S. patent application Ser. No. 16/750,348, which is fully incorporated by reference herein and U.S. design patent number D956,581, which is fully incorporated by reference herein.

As shown in FIG. 1, the timer 12 has a colored disk 16 secured to a rotatable shaft 18 such that the colored disk 16 rotates with the shaft 18. In most embodiments, the colored disk 16 rotates in a clockwise direction as time elapses and fills less of a circular opening 20 in a front wall 22 of the caddy 14.

As shown in FIG. 1, the timer 12 has a positioner 24 secured to the rotatable shaft 18. The positioner 24 is accessible through the circular opening 20 in a front wall 22 of the caddy 14. The positioner 24 has a circular main portion 26 and an extension 28 extending outwardly from the circular main portion 26. The extension 28 of the positioner 24 is aligned with a traveling edge 30 of the colored disk 16. By rotating the positioner 24 manually in a direction opposite to the direction of rotation of the rotatable shaft 18 and colored disk 16, a user may set the time to elapse. In the embodiment illustrated, the rotatable shaft 18 is rotated in a clockwise direction by the control module (not shown), and the positioner 24 may be manually rotated by a user in a counterclockwise direction. The positioner 24 rotates with the colored disk 16, the extension 28 of the positioner 24 constantly traveling with the traveling edge 30 of the colored disk 16.

In some embodiments of timer, a positioner is not secured to the rotatable shaft 18 of the timer. A positioner is instead formed outside of the traveling edge 30 of the colored disk 16. Such a positioner is shown in U.S. Design Patent No. D912,551, which is fully incorporated by reference herein.

As best shown in FIG. 3, the caddy assembly 14 of the timer kit 10 comprises a generally planar front wall 22 which is generally rectangular in shape and has an enlarged perimeter edge 32 with triangular reinforcements 36. FIG. 3 shows a rear surface 34 of the front wall 22 while FIG. 1 shows a front surface 40 of the front wall 22. The front surface 40 of the front wall 22 is a dry erase surface, meaning that such surface may be written upon.

As best shown in FIGS. 4 and 5, the front wall 22 of the caddy assembly 14 has an annular protrusion 46 integrally formed in the front wall 22 of the caddy assembly 14 and protruding outwardly from the front surface 40 of the front wall 22. The annular protrusion 46 extends around the circular opening 20 formed in the front wall 22 of the caddy assembly 14. The annular protrusion 46 has an annular bead 44 at the terminal end thereof. The annular protrusion 46 forms an annular groove 42 extending around the circular opening 20 formed in the front wall 22 of the caddy assembly 14.

As best shown in FIG. 1, a plurality of numeral indicia are printed on the annular protrusion 46 of the front wall 22 of the caddy assembly 14 to assist a user determine where the locate the positioner 24 of the timer 12 initially. The numeral indicia are spaced from each other in increments of five and show a total of 60 which usually indicates minutes but may indicate seconds of time. Any other numbers may be used depending upon the timer being used. Upon assembly, the numbers of the timers are hidden behind the front wall 22 of the caddy assembly 14.

Turning now to FIG. 3, the caddy assembly 14 further comprises a caddy 28 which has a generally U-shaped inner wall 50 and retaining lugs 52 adapted to receive a portion of the generally U-shaped inner wall 50. The caddy 38 also has a continuous outer wall 54 which varies in depth and extends upwardly from a bottom 56. A plurality of internal dividers 58 are formed in the caddy 38 to create a plurality of storage compartments 60 of different sizes. Each of the storage compartments 60 has an open top in order to receive pens, pencils, markers and such (only one being shown).

Some of the storage compartments 60 are sized to receive clips 62 as shown in FIG. 3. Each of the clips 62 has a recess 64 at the near end of a slot 66 such that one of the internal dividers 58 of the caddy 38 may slide into the slot 66 to store the clip 62 as shown in FIG. 5. As best shown in FIGS. 1 and 5, one of the clips 62 may be secured in place outside the front wall 22 of the caddy assembly 38 to mark a certain time for a certain event to occur. As best shown in FIG. 5, the annular bead 44 is located in the recess 64 of the clip 62 to secure the clip 62 in its desired location.

As best shown in FIG. 4, the caddy assembly 14 has a receptacle 70 having a floor 72. The floor 72 has a flange 74 through which the fasteners 48 extend to secure the front wall 22 of the caddy assembly 14 to the caddy 38 of the caddy assembly 14. As shown in FIG. 4, to assembly the timer kit 10, the timer 12 is lowed in a generally vertical direction as shown by the arrow 76 into the receptacle 70 of the caddy assembly 38. FIG. 5 shows the timer 12 in a position inside the receptacle 70 of the caddy assembly 38 so that the colored disk 16 of the timer 12 is visible through the circular opening 20 in the front wall 22 of the caddy assembly 14 and the positioner 24 of the timer 12 may be used by an operator to initially set the trailing edge 30 of the colored disk 16 is a desired position. The timer 12 may be separated from the caddy assembly 14 by lifting the timer 12 vertically out of the receptacle 70.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the faces of the boards may show different time periods than those illustrated. The invention resides in each individual feature described herein, alone, and in all combinations of any and all of those features. Accordingly, the scope of the invention shall be limited only by the following claims and their equivalents.

What is claimed is:

1. A timer kit comprising:
a generally rectangular timer for displaying remaining and elapsed time, the generally rectangular timer having a colored disk secured to a rotatable shaft such that the colored disk rotates with the shaft; and
a caddy assembly comprising a front wall and a molded caddy secured to the front wall, the front wall having a circular opening therein and numerical indicia marks printed thereon, the molded caddy having a holding wall and a plurality of storage compartments, a receptacle being created between the front wall of the caddy assembly and the molded caddy of the caddy assembly, wherein
the generally rectangular timer is inserted in the receptacle to assemble the timer kit and the generally rectangular timer is separable from the caddy assembly by lifting the generally rectangular timer out of the receptacle behind the front wall of the caddy assembly.

2. The timer kit of claim 1, wherein the generally rectangular timer further comprises a positioner for manually setting a traveling edge of the colored disk.

3. The timer kit of claim 1, wherein the colored disk of the generally rectangular timer is seen and being movable through the circular opening in the front wall of the caddy assembly.

4. The timer kit of claim 1, wherein the positioner is accessible through the circular opening in the front wall of the caddy assembly.

5. The timer kit of claim 1, further comprising a plurality of clips adapted to be stored in the storage compartments of the molded caddy.

6. The timer kit of claim 5, wherein the front wall of the caddy assembly has an annular protrusion around the circular opening with an annular bead at the end of the annular protrusion and the clips each have a recess adapted to receive the annular bead.

7. The timer kit of claim 1, wherein a front surface of the front wall of the caddy assembly is a dry erase surface.

8. A combination timer and caddy assembly, the combination comprising:

a battery powered timer having a colored disk which rotates as time elapses, a visible portion of the colored disk becoming smaller as time elapses; and
a caddy assembly comprising a front wall and a molded caddy, the caddy assembly having a receptacle adapted to receive and retain the battery powered timer such that the timer is behind the front wall of the caddy assembly and the colored disk of the battery powered timer is visible through a circular opening in the front wall of the caddy assembly, the front wall having numerical indicia marks printed thereon which indicate to an operator at which time to manually set the position of the colored disk using a positioner accessible through the circular opening in the front wall.

9. The combination of claim 8, wherein the front wall of the caddy assembly has an annular protrusion around the circular opening with an annular bead at the end of the protrusion for receiving and retaining clips.

10. The combination of claim 8, wherein the molded caddy has a generally U-shaped holding wall which, in combination with the front wall of the caddy assembly defines the receptacle for receiving and retaining the battery powered timer.

11. The combination of claim 8, wherein a front surface of the front wall of the caddy assembly is a dry erase surface which may be written upon.

12. The combination of claim 8, wherein the molded caddy has storage compartments of different sizes.

13. The combination of claim 8, wherein the colored disk of the battery powered timer rotates in a clockwise direction as time elapses.

14. A method of constructing a timer kit, the method comprising:
providing a timer having a colored disk secured to a rotatable shaft such that the colored disk rotates with the shaft as time elapses, a visible portion of the colored disk becoming smaller as time elapses, the timer further comprising a positioner secured to the rotatable shaft for positioning a trailing edge of the colored disk; and
providing a caddy assembly including a front wall having a circular opening therein and numerical indicia marks printed on an outer surface of the front wall and a caddy, the caddy having a holding wall and a plurality of storage compartments for storing markers;
vertically moving the timer down into a receptacle through an open top of the receptacle behind the front wall of the caddy assembly such that the colored disk is visible through the circular opening in the front wall of the caddy assembly and the positioner of the timer is accessible through the circular opening in the front wall of the caddy assembly.

15. The method of claim 14, wherein the positioner of the timer is manually positioned to correspond to one of the numerical indicia marks printed on an outer surface of the front wall of the caddy assembly.

16. The method of claim 14, wherein the timer may be separated from the caddy assembly only by lifting the timer out of the receptacle.

17. The method of claim 14, wherein the front surface of the front wall of the caddy assembly is a dry erase surface which may be written upon.

18. The method of claim 14, further comprising securing clips to the front wall of the caddy assembly.

19. The method of claim 18, wherein the front wall of the caddy assembly has an annular protrusion around the circular opening with an annular bead at the end of the annular protrusion and each of the clips has a recess adapted to receive the annular bead to secure the clip to the front wall of the caddy assembly.

20. The method of claim 19, wherein the clips are placed at desired locations.

\* \* \* \* \*